UNITED STATES PATENT OFFICE.

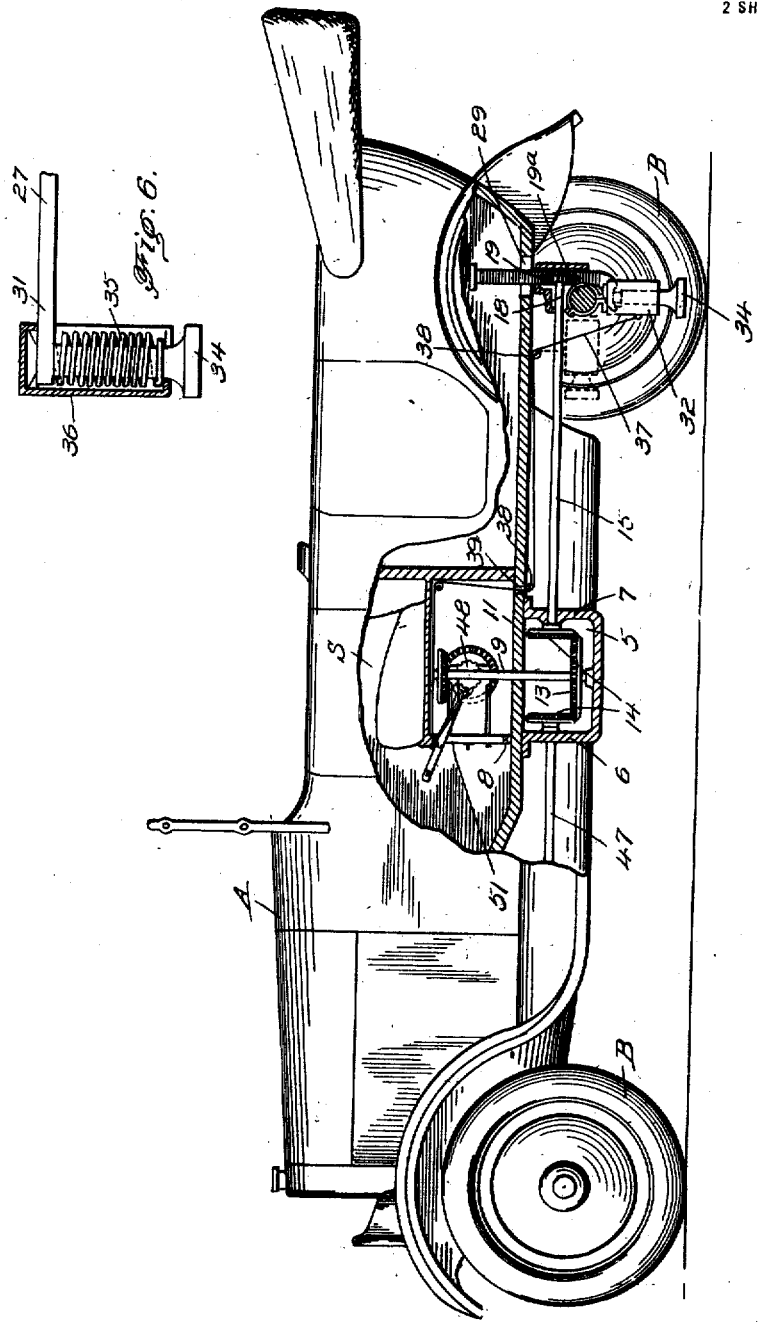

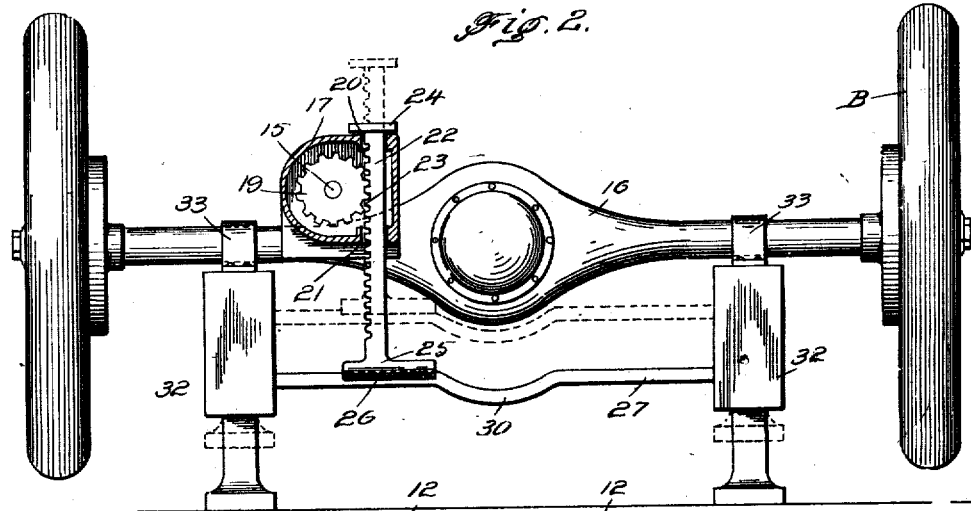
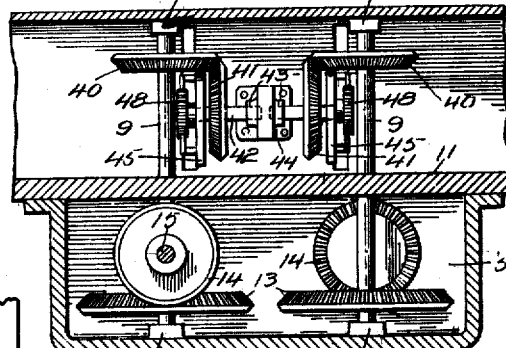
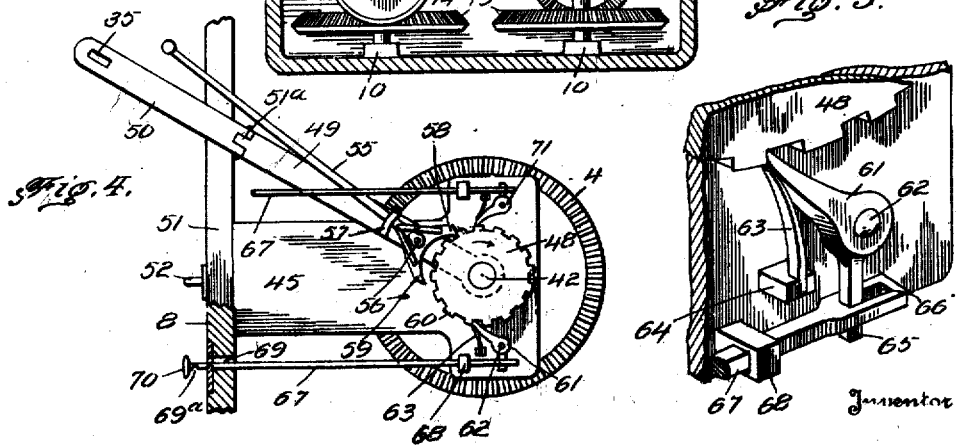

CLARENCE W. BOWERS, OF HEPPNER, OREGON.

AUTOMOBILE LIFTING MECHANISM.

1,401,869.  Specification of Letters Patent.  Patented Dec. 27, 1921.

Application filed March 15, 1921. Serial No. 452,604.

*To all whom it may concern:*

Be it known that I, CLARENCE W. BOWERS, a citizen of the United States, residing at Heppner, in the county of Morrow and State of Oregon, have invented certain new and useful Improvements in Automobile Lifting Mechanism, of which the following is a specification.

This invention relates to improvements in lifting devices for automobiles and more particularly to a construction whereby the entire machine may be raised and lowered from the ground without leaving the vehicle.

The primary object of the invention resides in the provision of a lifting device to be carried by and constituting a part of a motor vehicle, said device being operable from a position at the seat of the machine to raise or lower either the front or rear axle and the supporting wheels from the ground so that the machine will be in a position to make repairs without necessitating the use of separable lifting jacks, tools, or other hoisting means.

Another object of the invention is to provide a plurality of jacks to be carried at all times by the housing or casing of the front and rear axle of a vehicle or to the chassis of the same whereby the front or rear jacks may be simultaneously operated from a position in the machine and thus raise and lower the body thereof, the mechanism being so arranged as to be concealed beneath the vehicle.

A still further object of the invention is directed to a new and improved lifting mechanism for independently operating a pair of front and rear jacks carried by the front and rear axle housing or the chassis of the vehicle, including provision whereby the mechanism may be locked when the machine is in its raised position and thus prevent unauthorized movement of the vehicle and also relieve the wheels and tires from undue strain due to the weight of the machine if it is to remain idle for any considerable length of time as in storage or in a garage.

Another and further object of the invention will be found to reside in the employment of a plurality of jacks to be secured and carried by the body of the machine and completely concealed beneath the same in such position that they may be lowered from a horizontal, inoperative position to a vertical, operative position, including manually operable mechanism for simultaneously operating a pair of jacks to raise the front or rear of the machine and also lower the same from a position at the steering wheel.

A equally and continued object of the invention resides in the construction of a novel and improved lifting mechanism which may be installed in practically any type of motor vehicle without interfering with or in any way reorganizing or changing its operative parts and which in its entirety will constitute a highly meritorious adjunct in improvements on the machine in accomplishing its intended purposes.

The final object of the invention resides in the provision of a new and improved jack operating mechanism for motor vehicles which will be extremely simple in construction, highly efficient in operation, practical, durable, consisting of comparatively few parts therefor inexpensive to manufacture, capable of being easily installed and removed, and of universal application in connection with existing types of motor vehicles now in general use.

With these objects in view and others which will be suggested and manifest as the purposes and nature of my invention are revealed in the following specifications and drawings, wherein I have shown but one embodiment thereof.

Figure 1 is a view of a conventional motor vehicle with parts broken away to show the invention in use.

Fig. 2 is a view of a rear axle housing showing the position of the rear jack and the lifting mechanism therefor.

Fig. 3 is an enlarged view of the operating mechanism taken on the line 3—3 of Fig. 1.

Fig. 4 is a detailed view of the jack handle and ratchet mechanism for operating one pair of jacks.

Fig. 5 is a detail view of one of the locking dogs and releasing mechanism therefor.

Fig. 6 is a view of one of the jacks.

Referring now to the drawing wherein like parts designate similar parts throughout the specification, I have shown my invention as mounted on a conventional type of automobile body A, having the usual front and rear ground supporting wheels B and seat S, from which the jacks are operated by the operator at the steering wheel, in the manner now to be described in detail.

Beneath the seat S there is provided a housing 5 having a front wall 6 and a rear wall 7 wherein the gears are located for operating the jacks at the front and rear of the machine, subsequently to be referred to. Broadly speaking the mechanism for raising and lowering the front and rear axle or the body of the machine consists of a pair of jacks adapted to be carried by the front and rear axle housings or chassis of the machine, each pair of jacks being similarly arranged and similarly operated in the manner now to be set forth.

The mechanism for operating the rear pair of jacks is exactly similar to that for operating the front jacks, it being of course understood that two jack handles are provided extending outwardly from the front wall 8 of the seat, which handles may be independently or simultaneously operated. It will therefore be only necessary to describe the operating mechanism for one set of jacks and therefore I have shown in detail the lifting jacks as positioned with respect to the rear of the machine in the manner in which they are to be operated from the seat S of the vehicle.

Within the housing 5 there are provided a pair of vertical shafts 9 journaled in bearings 10, said shafts extending upwardly through the flooring 11 of the vehicle and journaled in bearings 12 as clearly shown in Fig. 3 of the drawing. Each vertical shaft is provided with a horizontal, large beveled gear 13 positioned within the housing which meshes with another beveled gear 14 on the end of a longitudinal shaft 15 extending to the rear of the machine for simultaneously operating a pair of rear jacks.

The rear axle casing 16 supports a housing 17 at one side of the differential casing for receiving the rear end 18 of the said longitudinal shaft which carries a small rack pinion 19 extending slightly behind the rear axle 19ᵃ of the vehicle. The top and bottom of the said housing 17 is slotted at 20, 21 to permit the operation of a vertical rack 22, the teeth 23 of which are adapted to mesh with the rack pinion 19 above referred to carried by the longitudinal shaft. The rack is provided with a stop member 24 at one end thereof and with an enlarged, horizontal portion 25, at its opposite end, the said enlarged portion being preferably grooved at 26 throughout its length to embrace a horizontal connecting rod or bar 27 extending between a pair of jacks, said rack being operable through a slot or recess 29 in the flooring and beneath one of the rear seats of the machine, as clearly shown in Fig. 1. The horizontal connecting rod or bar 27 is bowed at 30 to permit the same to swing beneath the differential housing when the jacks are thrown in their inoperative position as shown in dotted lines in Fig. 1, the respective ends 31 of the bar 27 being connected to a pair of jacks designated by numeral 32 which are adapted to be clamped or otherwise suitably secured at 33 and to be carried at all times by the rear axle casing as suggested in Fig. 2. Any suitable type of jack may be utilized in this connection to be secured to the ends of the horizontal bar and in the form shown in Fig. 6, the foot member 34 connected with the end of the bar 27 is provided with a resilient spring 35 within the movable block 36 for operation in the manner above indicated. A flexible element 37 connected to the front of one of the blocks passes over pulleys 38 beneath the flooring of the vehicle and extends upwardly through a recess 39 beneath the seat S and then again forwardly through the front wall 8 where the operator may raise the said jacks to their inoperative position as shown in dotted lines on said figure.

It is to be understood that any other type or form of mechanism may be provided for raising or lowering the front or rear jacks to their operative and inoperative position without interfering with the gearing or operation of the machine. Of course, the manner of raising and lowering the front pair of jacks (not shown) may also be effected in the same manner as above described, whereby the front of the machine may be similarly raised or lowered. It will thus be seen and quite apparent that as the longitudinal shaft is rotated either to the left or right, the vertical rack will be raised or lowered correspondingly to actuate the pair of jacks simultaneously.

Each vertical shaft 9 also carries near its upper end a small beveled gear 40 which meshes with a beveled gear 41 carried by a stub shaft 42 journaled at 43 in a bearing block 44 and in a T-shaped bracket 45 extending at right angles to the front wall 8. It is of course understood that the stub shafts 42 are independent of each other for actuation, the left hand stub shaft being operatively connected with the rearwardly extending shaft 15 and the right hand stub shaft being connected to the forwardly extending shaft 47 which operates the front pair of jacks (not shown).

Each horizontal stub shaft above referred to which carries the ratchet wheels 48 at their outer ends, is also provided with a sectional, operating handle 49 for actuating said shaft and gearing above described. The outer end 50 of the said handle extends through a slot 51 in the wall A and is hingedly connected at 51ᵃ whereby the said section may be thrown at right angles and locked to the ratchet member 52 which engages in the recess 53 in the end thereof. This construction permits the handle to be locked when the machine is raised from the ground and therefore constitutes an effective means for preventing unauthorized removal of the machine when it is in its inoperative position.

The operating handle above referred to also carries a spring pressed double toothed pawl 55 pivoted at 56 and movable in the guide member 57 carried by the handle whereby the teeth 58, 59 of said pawl may be moved into predetermined operative engagement with the teeth 60 of the ratchet wheel to rotate the same in a clockwise direction as indicated by the arrow in Fig. 4, which is the raising position. In order to prevent the retrograde movement of the ratchet wheel, when the lever and its double toothed pawl is moved downward to engage the teeth of the ratchet wheel, I have provided a second pawl 61, pivoted at 62 to the T-shaped bracket, said pawl being provided with the usual spring 63 held by the extension 64 as clearly shown in Fig. 5. The pawl 61 above referred to carries a vertical arm 65 movable in a slot 66 in the end of a horizontal bar 67, which bar operates in a guide 68 secured to the bracket and extends forwardly through a slot 69 in the front wall 8 where it is held by the notches 69ª, the said bar being provided with a handle or knob 70 to operate the arm of said pawl to release it from the ratchet when it is desired to lower the machine upon movement of the ratchet wheel in an anti-clockwise direction. In order to permit this movement and operation, it is also necessary to provide another pivoted spring controlled pawl 71 similar to and operable in the same manner as the pawl 61 above referred to but positioned above the ratchet wheels in suspended reversed position as shown in Fig. 4. It will thus be seen that in this instance when the ratchet is engaged by the toothed 59 to rotate the same in an anti-clockwise direction in lowering the machine, the last mentioned pivoted pawl 71 will prevent the retrograde movement of the ratchet similar to but in the reverse manner as above described.

In the actual operation of the lifting device, when it is desired to raise the rear or front of the machine, the respective front or rear jacks are lowered by the flexible element from the dotted line position indicated in Fig. 1. The operator will then actuate the pivoted pawl 61 to engage the ratchet wheel 48 and then oscillate the double toothed pawl to bring the tooth 58 in position as shown in Fig. 4. As the lever 49 is raised and lowered, it will actuate the ratchet wheel 48 in a clockwise direction as indicated by the arrow, the pawl 61 preventing the retrograde movement of said ratchet wheel and the stub shaft 52 when the tooth 58 is thrown out of engagement upon the lowering of the handle 49. The actuation of the ratchet member 48 and the stub shaft 42 will of course operate the vertical shaft 9 and consequently the longitudinally, rearwardly extending shaft 15 and the rack pinion 19. As the rack pinion 19 is rotated it will of course lower the rack 22 and the transverse connecting rod 27 of the said rack, thus raising the rear of the machine from the ground. When it is desired to lower the machine from its raised position, the operator will actuate the rod 67 connected to the upper spring pressed pawl 71 to throw the same into engagement with the ratchet wheel 48 and then release the pawl 61. The tooth 59 is then moved into engagement with the ratchet wheel 48 and upon actuation of the handle 49 the ratchet wheel 48 will be moved in an anti-clockwise direction with the result that the stub shaft and its gearing will rotate the longitudinal shaft 15, rack pinion and rack in a reverse direction and consequently lower the machine.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the United States is:—

1. In a device of the class described comprising lifting elements independently connected to the axles of a vehicle, means for lowering and raising either pair of said elements to their operative and inoperative positions with respect to the vehicle and means for simultaneously actuating either of said pairs of lifting elements from the seat of the vehicle.

2. In a device of the class described comprising lifting elements independently connected to the axles of a vehicle, means for lowering and raising either pair of said elements to their operative and inoperative positions with respect to the vehicle and gearing for simultaneously or independently actuating either of said pairs of lifting elements from a position at the seat of the vehicle.

3. In a device of the class described comprising front and rear lifting elements loosely connected to the axles of a vehicle, flexibly connected means for lowering and raising said elements to their operative and inoperative position with respect to the vehicle and manually operable gearing connected to said lifting elements for actuating the same simultaneously or independently of each other from a position at the seat of the vehicle.

4. In a device of the class described comprising front and rear lifting elements loosely connected to the axles of a vehicle, flexibly connected means for lowering and raising said elements to their operative and inoperative positions from the seat of the vehicle, and manually operable gearing located beneath said seat and independently connected to said elements for simultaneously actuating the same while the motor is running.

5. In a device of the class described comprising front and rear lifting elements loosely connected to the axles of a vehicle, a connecting bar between said elements, flexibly connected means attached to one of said elements for lowering and raising the same to their operative and inoperative positions from the seat of the vehicle, a rack and pinion operatively connected to said connecting bar, gearing located beneath the seat for controlling said rack and pinion and manually operable means for rotating said gearing to simultaneously actuate said lifting elements from a position at the seat while the motor is running or inoperative.

6. In a device of the class described comprising front and rear lifting elements loosely connected to the axles of a vehicle, a bowed connecting bar between said elements, flexibly connected means attached to one of said elements whereby the same may be inoperably suspended beneath the body of the vehicle, a rack and pinion supported by the axles, for operative engagement with the connecting bar, manually operable gearing beneath the seat of the vehicle for actuating said rack and pinion to raise and lower the said connecting bar, a sectional handle for rotating said gearing and means for locking said handle and gearing when the vehicle is in its inoperative, raised position.

7. In a device of the class described comprising front and rear lifting elements loosely connected to the axles of a vehicle, a bowed connecting bar between said elements, flexibly connected means secured beneath the body of the vehicle and attached to one of said elements, whereby the same may be lowered or raised to their respective operative and inoperative positions, from a position at the seat of the vehicle, a housing supported by each of said axles, a pinion and vertical rack operable within said housing and connected to said connecting bar for actuating said lifting elements, gearing located beneath the seat of the vehicle for operating said rack and pinion, a sectional handle for rotating said gearing, a double toothed pivoted pawl carried by said handle and independently connected pawls for preventing the retrograde movement of said gearing when the machine is being raised or lowered.

In testimony whereof, I affix my signature hereto.

CLARENCE W. BOWERS.